United States Patent [19]

van der Veen

[11] Patent Number: 4,852,427
[45] Date of Patent: Aug. 1, 1989

[54] TRANSMISSION

[75] Inventor: Siebren C. van der Veen, Veldhoven, Netherlands

[73] Assignee: Van Doorne's Transmissie B.V., Tilburg, Netherlands

[21] Appl. No.: 445,748

[22] Filed: Nov. 30, 1982

[30] Foreign Application Priority Data

Dec. 3, 1981 [NL] Netherlands ............... 8105451

[51] Int. Cl.⁴ ............................................. F16H 37/00
[52] U.S. Cl. ......................................... 74/689; 74/740
[58] Field of Search ............... 74/718, 720, 730, 731, 74/732, 740, 745, 785, 788, 689, 688

[56] References Cited

U.S. PATENT DOCUMENTS

| 2,956,449 | 10/1960 | Foerster | 74/730 |
|---|---|---|---|
| 3,301,094 | 1/1967 | Prakash | 74/718 |
| 3,340,749 | 9/1967 | Magg | 74/689 |
| 3,442,346 | 5/1969 | Winter | 74/745 |
| 4,290,320 | 9/1981 | Abbott | 74/689 |
| 4,455,888 | 6/1984 | Wayman | 74/730 |

FOREIGN PATENT DOCUMENTS

| 0004412 | 10/1979 | European Pat. Off. | 74/689 |
|---|---|---|---|
| 0049454 | 5/1981 | Japan | 74/689 |
| 2025545 | 1/1980 | United Kingdom | 74/731 |

Primary Examiner—Dirk Wright
Attorney, Agent, or Firm—Cushman, Darby & Cushman

[57] ABSTRACT

A transmission includes an input shaft; a torque converter having an output and having an input drivingly connected to the input shaft, the torque converter being axially aligned with the input shaft; an infinitely variable V-belt transmission unit including a primary shaft and a secondary shaft, the primary and secondary shafts being parallel to and offset from the input shaft and torque converter; a transmission output shaft drivingly connected to the secondary shaft; a first power path between the input shaft and the seconary shaft, including the torque converter and a first gear set drivingly connecting the output of the torque converter to the secondary shaft whereby the first power path does not make use of the V-belt transmission; and a second power path between the input shaft and the secondary shaft including a mechanical clutch drivingly connecting the input shaft through a second gear set with the primary shaft whereby the secondary shaft is driven by the V-belt transmission.

5 Claims, 2 Drawing Sheets

TRANSMISSION

The invention relates to a transmission, in particular for a vehicle, provided with a hydrodynamic torque converter, an input shaft mounted coaxially with it, an infinitely variable V-belt transmission with a primary and a secondary shaft, and with an output shaft driven by the secondary shaft, the layout being such that the secondary shaft can be driven by the input shaft through the torque converter, while the primary shaft can be driven by the input shaft through a mechanical clutch.

BACKGROUND

The transmission of power by means of a transmission system of the kind summarized above may take place by either one of two pathways. The first power path runs via the torque converter which acts at the same time as starting or drive-away coupling. In it, the power is transmitted not via the V-belt transmission, but from the input shaft via the torque converter direct to the secondary shaft of the V-belt transmission, while the primary shaft transmits no power.

The second power path runs via the V-belt transmission. Here, the input shaft drives the primary shaft directly, the torque converter being cut out.

Such a transmission is known from the British Patent application No. 2,025,545, which describes a transmission system whose input shaft, torque converter and primary shaft of the V-belt transmission have been mounted coaxially. In this known system, the input shaft can be held in a fixed position relative to the primary shaft by means of a mechanical coupling, so that the input shaft and the primary shaft rotate as one, giving rise to the aforesaid second power path.

In the transmission system according to the said British Pat. No. 2,025,545, the first power path comes about inasmuch as the output shaft of the torque converter mounted coaxially with the primary shaft drives the secondary shaft by means of chain transmission. Because of this chain transmission, the secondary shaft rotates in the same direction as the input shaft (and the torque converter), which is essential in a design of this type. If a gear-wheel transmission were used, an intermediate gear would have to be inserted in order to obtain the right sense of rotation.

SUMMARY OF THE INVENTION

It is of the object of the present invention to produce a transmission of the above-described type which does not incorporate a chain transmission and which also allows a difference in speed between the input shaft and the primary shaft.

According to the invention, this is achieved by mounting the input shaft and the torque converter parallel to the primary and secondary shafts, but not coaxially with said shafts, and by providing for both the primary and the secondary shaft to be driven through gear-wheel transmissions. This set of gear-wheel transmission effect a reversal of the direction of rotation relative to the input shaft, doing so both when driving the primary shaft and when driving the secondary shaft, so that the secondary and the primary shaft nonetheless have the same direction of rotation.

The difference in speed between the input shaft and the primary shaft, made possible by the incorporation of the gear-wheel transmission, is of great importance for achieving the optimum rotation speed of the V-belt transmission with different types of driving engines (gasoline, diesel, turbine, electric, and so on), which operate in different speed ranges.

According to the more specific features of the invention, the output shaft may be driven by the secondary shaft through a forward/reverse shift coupling.

In a motor vehicle it is not generally required that a high speed can be attained in reverse, so that the use of only the first power path suffices. In consequence, according to another feature of the invention, the secondary shaft can be driven through a reversing clutch in the form of an epicyclic gear-wheel transmission which is provided with a primary coupling, which, upon being engaged, causes the gear-wheel transmission to rotate as a whole, and a secondary coupling which, upon being engaged, causes the direction of rotation to be reversed. The reversing clutch is included in the first power path.

BRIEF DESCRIPTION OF THE DRAWINGS

In the Figures, corresponding parts are denoted by the same reference numerals.

DETAILED DESCRIPTION

Figure 1:
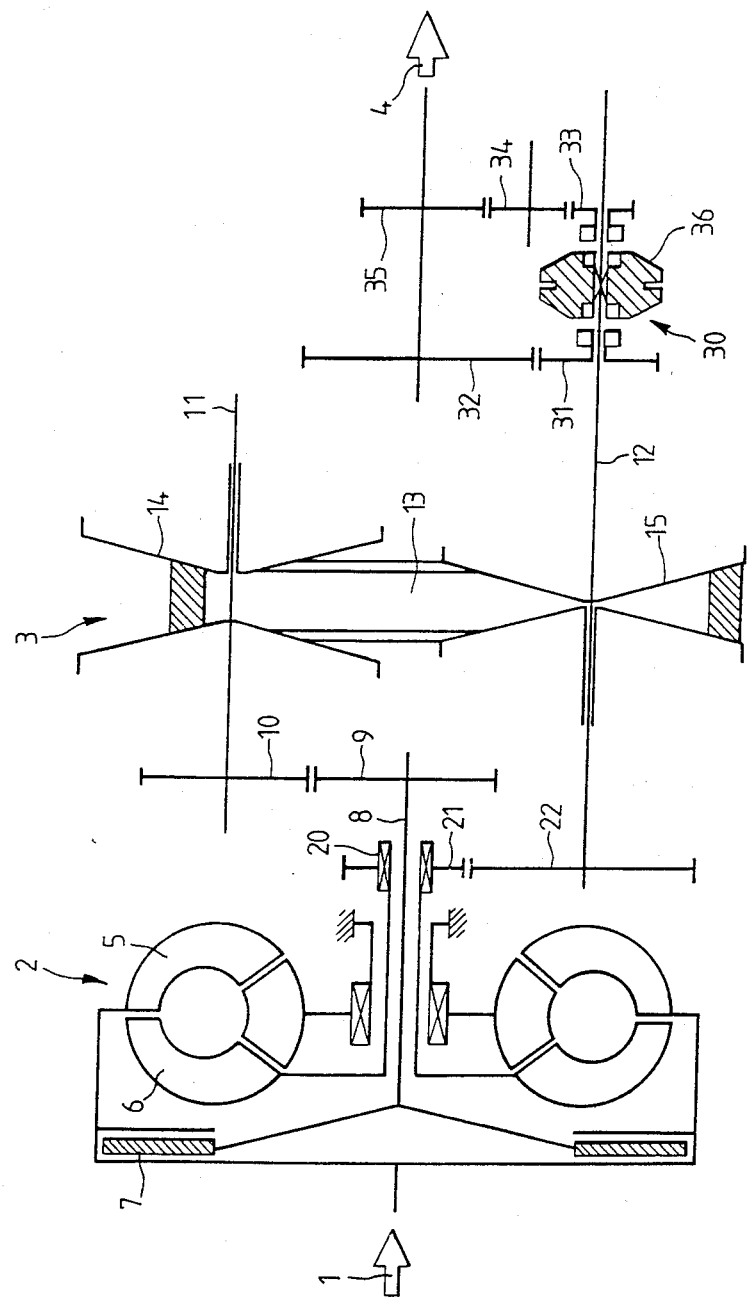
FIG. 1 is a schematic view of a transmission in which a forward/reverse shift coupling is interposed between the secondary shaft and the output shaft.

Both embodiments are provided with an input shaft 1, hydrodynamic torque converter 2, an infinitely variable V-belt transmission 3 and an output shaft 4.

The input shaft 1 is connected to the pump wheel 5 of the hydrodynamic torque converter 2, which also has a turbine wheel 6. The input shaft 1 can, in addition, be connected by means of clutch 7 to shaft 8 which may drive the primary shaft 11 through a gear-wheel transmission 9, 10. The primary shaft 11 and the secondary shaft 12 are parallel to but offset from the input shaft 1 and the torque converter 2. The primary shaft 11 and the secondary shaft 12 are linked together by the transmission 3 which includes a V-belt 13 which has been looped over the pulleys 14 and 15. The pulley 14 is mounted on the primary shaft 11 for rotation therewith. The pulley 15 is mounted on the secondary shaft 12 for rotation therewith. The transmission 3 is conventional in that each pulley 14,15 is formed of two conical discs one of which can be moved toward and away from the other disc so as to shift the V-belt 13 and vary the speed ratio between the shafts 11 and 12.

In the embodiment according to FIG. 1, the turbine wheel 6 of the torque converter is connected by means of a oneway clutch 20 to gear wheel 21. This gear wheel 21 meshes with gear wheel 22 mounted on the secondary shaft 12 for rotation therewith. Said one-way clutch 20 enables gear wheel 21 to have a speed equal to the speed of shaft 8 or allows gear wheel 21 to obtain a higher speed. Furthermore, a forward/reverse shift coupling 30 is mounted on the secondary shaft 12, enabling the output shaft 4 to be driven in either direction: either forward by means of gear wheels 31,32 or reverse by means of gear wheels 33, 34, 35. To this end, either gear wheel 31 or gear wheel 33 is connected to the secondary shaft 12 with the aid of sliding dog clutch 36.

The embodiment according to FIG. 1 operates as follows.

The input shaft 1 can be connected to the engine of a vehicle, while the output shaft 4 drives the wheels through a differential, as required. When the vehicle takes off from standstill, the clutch 7 is not engaged, so that the engine power is transmitted to the output shaft 4 through the hydrodynamic torque converter 2, the gear-wheel transmission 21, 22, the secondary shaft 12 and the reversing clutch 30. Depending on the position of the sliding dog clutch 36, the vehicle moves away either forwards (through the gear-wheel transmission 31,32) or backwards (through the gear-wheel transmission 33, 34, 35). The V-belt transmission will probably rotate correspondingly, but does not actually participate in the transmission of power.

Driving away frm standstill therefore takes place through the hydrodynamic torque converter 2, which is otherwise a known technique. It thus involves conducting the power through the transmission along the above mentioned pathway which is referred to in this application as the first power path.

After the torque converter 2 has reached such a speed that the difference in speed between the pump-wheel 5 and the turbine wheel 6 has become small, clutch 7 can be engaged. Said engagement may be controlled by an external signal or may be induced by displacement of weights due to centrifugal forces after a certain rotation speed has been reached. The power will then be transmitted no longer through the torque converter, but through the gear-wheel transmission 9, 10 to the primary shaft 11 and next via the V-belt 13, the secondary shaft 12 and the reversing clutch 30 to the output shaft 4. This mode of transmitting the power is referred to in the present application as the second power path.

The gear wheels 9, 10 and 21, 22 should be chosen such that the overall transmission ratio defined by the gear wheels 9, 10 and the low position of the V-belt 13 as represented in the drawing is equal to or smaller than the transmission ratio of the gear wheels 21, 22. As a result, the rotational speed of gear wheel 21 will be higher than that of turbine wheel 6 when clutch 7 is engaged, so that the one-way clutch 20 acts as such and does not therefore transmit any power.

Figure 2:
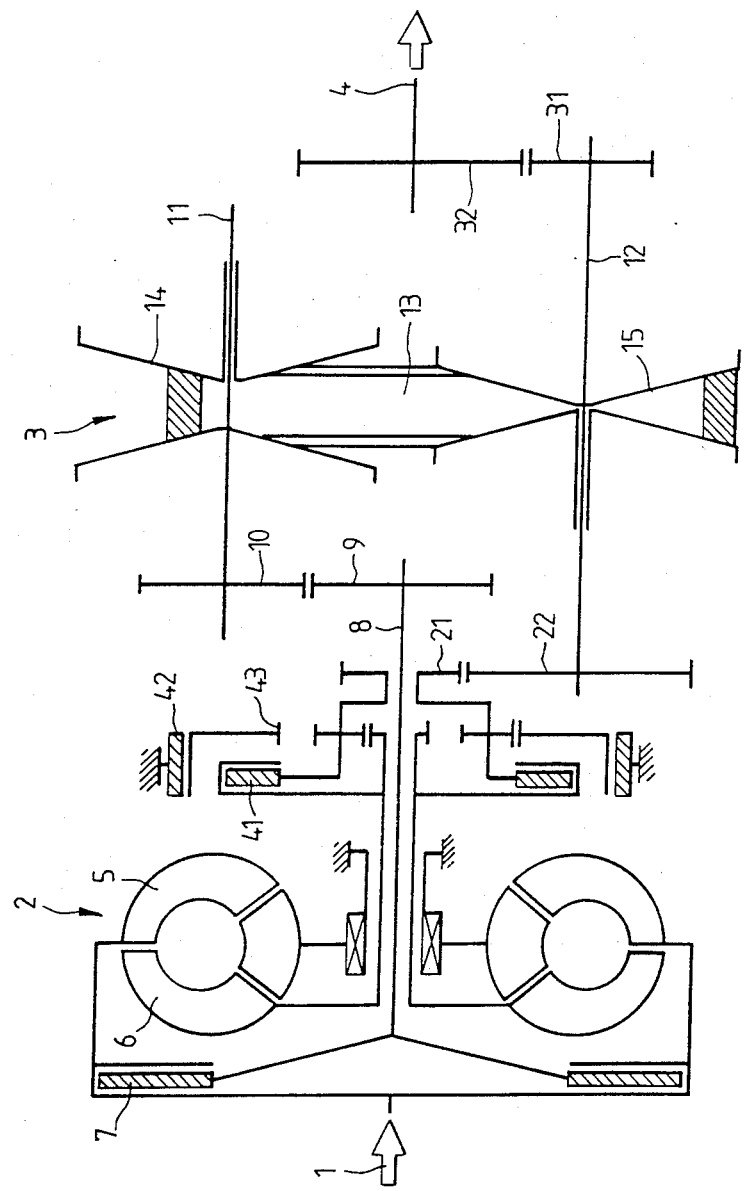
FIG. 2 is a schematic view of a transmission with a reversing clutch in the form of an epicyclic gear-wheel transmission.

FIG. 2 schematically shows a second embodiment where the reversing clutch in the form of an epicyclic gear-wheel transmission 40 has been disposed coaxially with the torque converter 2, the power flow proceeding along the first power path.

In driving away forwards from standstill, clutch 41 is engaged, whereby the turbine wheel 6 is coupled direct to the gear wheel 21. The set of epicyclic gears now rotate as one unit. During reversing from standstill, clutch 42 is engaged, so that the ring gear 43 is held stationary. From the Figure it will be clear that in consequence the gear wheel 21 is driven in the opposite direction relative to the turbine wheel 6. This arrangement makes reverse driving possible, but only with the use of the first power path.

The second power path comes into play when clutch 7 is engaged—and clutches 41 and 42 have been disengaged—in the same manner as has been described in the foregoing for the first embodiment.

From the Figure it will be clear that in the transmission according to the invention the infinitely variable V-belt transmission 3 rotates in opposite direction relative to the input shaft 1. Because of this, both the primary shaft 11 of the V-belt transmission 3 and the secondary shaft 12 can be driven by the input shaft 1 through a single gear-wheel transmission 9, 10 and 21, 22, respectively. By modification of the gear wheels 9, 10 and 21, 22 it is also possible to choose the difference in speed between the input shaft 1 and the primary shaft 11 such that the optimum speed of the V-belt transmission 3 is attained at a given range of the input rotation speed.

It will be readily apparent that other embodiments are conceivable within the purview of the invention, such as an embodiment in which the one-way clutch 20 of FIG. 1 has been replaced by a controllable clutch or in which, for instance, a hydraulic retarder has been installed on the secondary shaft.

What is claimed is:

1. A transmission, in particular for a vehicle, comprising a hydrodynamic torque converter, a prime mover shaft mounted coaxially with the torque converter, an infinitely variable V-belt transmission unit with a primary and a secondary shaft, an output shaft driven by the secondary shaft through a first gear set, the layout being such that in a first mode the secondary shaft of the V-belt transmission is driven by the prime mover shaft through the torque converter while the V-belt transmission is idle, and such that in a second mode the primary shaft is driven by the prime mover shaft through a mechanical clutch, the prime mover shaft and the torque converter being parallel, but not coaxial, relative to the primary and to the secondary shaft and both the primary and the secondary shaft being driven through gear-wheel transmissions.

2. A transmission according to claim 1, characterized in that the output shaft is driven by the secondary shaft through a forward/reverse shift coupling.

3. A transmission according to claim 1, characterized in that the secondary shaft is driven through an epicyclic gear-wheel transmission provided with a first clutch, engagement of which causes the gear-wheel transmission to rotate as one unit, and with a second clutch, engagement of which causes the direction of rotation to be reversed.

4. A transmission comprising: a prime mover shaft; a torque converter having an output and having an input drivingly connected to said prime mover shaft, said torque converter being axially aligned with said prime mover shaft; an infinitely variable V-belt transmission unit including a primary shaft and a secondary shaft, said primary and secondary shafts being parallel to and offset from said prime mover shaft and torque converter; a transmission output shaft drivingly connected to said secondary shaft; means forming a first power path between said prime mover shaft and said secondary shaft of the V-belt transmission, said means including said torque converter and a first gear set drivingly connecting the output of said torque converter to said secondary shaft whereby said first power path does not make use of said V-belt transmission; and power transmission means bypassing said torque converter and forming a second power path between said prime mover shaft and said secondary shaft, said means including a mechanical clutch drivingly connecting said prime mover shaft through a second gear set with said primary shaft whereby said secondary shaft is driven by said V-belt transmission.

5. A transmission as in claim 4 including a free-wheel coupling connected between said torque converter and said first gear set.

* * * * *